(12) United States Patent
Yang et al.

(10) Patent No.: US 9,634,798 B2
(45) Date of Patent: Apr. 25, 2017

(54) PROCESSING METHOD AND DEVICE FOR PACKET LOSS COMPENSATION IN VIDEO-CONFERENCING SYSTEM

(71) Applicant: ZTE Corporation, Shenzhen (CN)

(72) Inventors: Bohui Yang, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 37 days.

(21) Appl. No.: 14/429,484

(22) PCT Filed: Jul. 31, 2013

(86) PCT No.: PCT/CN2013/080507
§ 371 (c)(1),
(2) Date: Mar. 19, 2015

(87) PCT Pub. No.: WO2013/178185
PCT Pub. Date: Dec. 5, 2013

(65) Prior Publication Data
US 2015/0222390 A1 Aug. 6, 2015

(30) Foreign Application Priority Data

Sep. 24, 2012 (CN) .......................... 2012 1 0356587

(51) Int. Cl.
*H04N 7/15* (2006.01)
*H04L 1/00* (2006.01)
(Continued)

(52) U.S. Cl.
CPC .......... *H04L 1/0045* (2013.01); *H04L 65/403* (2013.01); *H04L 65/601* (2013.01);
(Continued)

(58) Field of Classification Search
CPC ... H04L 1/0045; H04L 65/403; H04L 65/601; H04N 19/146; H04N 19/65; H04N 19/89; H04N 21/2343; H04N 21/2383; H04N 21/4382; H04N 7/147; H04N 7/15
See application file for complete search history.

(56) References Cited

U.S. PATENT DOCUMENTS 5,687,095 A * 11/1997 Haskell ................ H04N 21/236
348/386.1
2003/0016630 A1* 1/2003 Vega-Garcia ........... H04L 29/06
370/252
(Continued)

FOREIGN PATENT DOCUMENTS

CN 1874484 A 12/2006
CN 101442781 A 5/2009
(Continued)

OTHER PUBLICATIONS

International Search Report for corresponding application PCT/CN2013/080507 filed Jul. 31, 2015; Mail date Oct. 31, 2013.
(Continued)

*Primary Examiner* — Stella Woo
(74) *Attorney, Agent, or Firm* — Cantor Colburn LLP

(57) ABSTRACT

A processing method and device for packet loss compensation in video-conferencing system are provided. The method includes: when a video conference is held, judging whether terminals participating in the video conference include one or more FEC terminals, if yes, matching code stream processing capabilities of transmitting terminal and receiving terminal between FEC terminals which transmit a code stream or between an FEC terminal and an ordinary terminal which transmit code stream, and converting a data code stream transmission rate of the transmitting terminal into a bearable data code stream rate of the receiving terminal. The device includes a judgment component and a matching component. The solution enables a terminal with packet loss to activate an FEC function to compensate lost data, and also enables an ordinary terminal without packet loss to keep an original data code stream rate for communication, thereby maximally ensuring the image quality of the video-conferencing system.

12 Claims, 2 Drawing Sheets

(51) Int. Cl.
*H04N 7/14* (2006.01)
*H04L 29/06* (2006.01)
*H04N 21/2343* (2011.01)
*H04N 21/2383* (2011.01)
*H04N 21/438* (2011.01)
*H04N 19/89* (2014.01)
*H04N 19/146* (2014.01)
*H04N 19/65* (2014.01)

(52) U.S. Cl.
CPC ............... *H04N 7/147* (2013.01); *H04N 7/15* (2013.01); *H04N 19/146* (2014.11); *H04N 19/65* (2014.11); *H04N 19/89* (2014.11); *H04N 21/2343* (2013.01); *H04N 21/2383* (2013.01); *H04N 21/4382* (2013.01)

(56) References Cited

U.S. PATENT DOCUMENTS

2007/0156924 A1  7/2007 Ramalingam
2008/0158339 A1* 7/2008 Civanlar ................ H04N 7/152
                                                           348/14.09
2009/0213726 A1* 8/2009 Asati ....................... H04L 1/007
                                                           370/216

FOREIGN PATENT DOCUMENTS

| CN | 102098586 A * | 6/2011 | ......... H04N 21/4382 |
| EP | 2312787 A1 | 4/2011 | |
| WO | 2010000705 A1 | 1/2010 | |
| WO | 2010076759 A2 | 7/2010 | |

OTHER PUBLICATIONS

Asati Cisco Systems R.: "Methods to Convey Forward Error Correction (FEC) Framework Configuration Information; efc6695.txt", IETF, Aug. 2, 2012, XP015084159.

European Search Report for corresponding application EP 13 79 7127; Report dated Nov. 26, 2015.

* cited by examiner

PROCESSING METHOD AND DEVICE FOR PACKET LOSS COMPENSATION IN VIDEO-CONFERENCING SYSTEM

TECHNICAL FIELD

The disclosure relates to the technical field of communication, particularly to a processing method and device for packet loss compensation in a video-conferencing system.

BACKGROUND

In an Internet Protocol (IP) multipoint conference in a video-conferencing system, a media code stream is transmitted in an IP network. A Multipoint Control Unit (MCU) or a terminal cannot receive a complete IP packet under the conditions of packet loss, jitter, delay and the like, which are caused by bad network conditions, thereby influencing the quality of images and sound, which are processed by the MCU or the terminal.

At present, forward Error Correction (FEC) is adopted to solve the problem of network packet loss by the video-conferencing system. According to the FEC scheme, an FEC processing module is added in an original media data processing flow, and performs FEC operation on a Real Time Protocol (RTP) media packet to be transmitted to calculate an FEC redundant data packet, and the FEC redundant data packet can be adopted to recover a lost packet to achieve a compensation effect if the packet loss of a source RTP code stream is discovered at a receiving end. However, the enabling of an FEC function requires consumption in a bandwidth of the terminal, the FEC terminal and the MCU exchange an actual coding bandwidth, and the actual bandwidth and the packet loss compensation bandwidth form a conferencing bandwidth. In order to ensure normal communication between an FEC terminal and an ordinary terminal or between FEC terminals, the bandwidths of all the terminals are required to be set to minimum in those of the terminals, and the bandwidths of the terminals under good network conditions are sacrificed.

SUMMARY

The embodiments of the disclosure provide a processing method and device for packet loss compensation in a video-conferencing system, thereby solving the problem that the bandwidths of the terminals under good conditions are sacrificed during communication between the FEC terminal and the ordinary terminal or between FEC terminals in a conventional video system.

According to one embodiment of the disclosure, a processing method for packet loss compensation in a video-conferencing system is provided, including:

when a video conference is held, judging whether terminals participating in the video conference include one or more FEC terminals or not, if yes, matching code stream processing capabilities of a transmitting terminal and a receiving terminal between FEC terminals which transmit a code stream or between an FEC terminal and an ordinary terminal which transmit a code stream, and converting a data code stream transmission rate of the transmitting terminal into a bearable data code stream rate of the receiving terminal.

In an example embodiment, judging whether the terminals participating in the video conference include one or more FEC terminals or not includes: judging whether each of the terminals participating in the video conference has an FEC function or not, if yes, further judging whether the FEC function of the terminal is enabled or not, and identifying the terminal of which the FEC function is enabled as the FEC terminal; and identifying the terminal which does not have the FEC function or of which the FEC function is not enabled as the ordinary terminal.

In an example embodiment, matching the code stream processing capabilities of the transmitting terminal and the receiving terminal and converting the code stream transmission rate of the transmitting terminal into the bearable code stream rate of the receiving terminal include: when the data code stream transmission rate of the transmitting terminal is higher than a data code stream transmission rate of the receiving terminal, converting the high code stream transmission rate of the transmitting terminal into the low data code stream transmission rate of the receiving terminal; and when the data code stream transmission rate of the transmitting terminal is lower than the data code stream transmission rate of the receiving terminal, converting the low data code stream transmission rate of the transmitting terminal into the high data code stream transmission rate of the receiving terminal.

In an example embodiment, if a terminal joins the video conference, whether the terminal has an FEC capability or not is judged, if yes, whether the FEC function of the terminal is enabled or not is judged, and the terminal of which the FEC function is enabled is identified as the FEC terminal; and if the terminal does not have the FEC function or the FEC function of the terminal is not enabled, the terminal is identified as the ordinary terminal.

In an example embodiment, identifiers of one or more FEC terminals and one or more ordinary terminals are notified to a system, and are displayed on a video conference interface.

According to another embodiment of the disclosure, a processing device for packet loss compensation in a video-conferencing system is also provided, including: a judgment component, configured to judge, when a video conference is held, whether terminals participating in the video conference include one or more FEC terminals or not, and if yes, trigger a matching component; and the matching component, configured to match code stream processing capabilities of a transmitting terminal and a receiving terminal between FEC terminals which transmit a code stream or between an FEC terminal and an ordinary terminal which transmit a code stream, and convert a data code stream transmission rate of the transmitting terminal into a bearable data code stream rate of the receiving terminal.

In an example embodiment, the judgment component is configured to judge whether each of the terminals participating in the video conference has an FEC function or not, if yes, further judge whether the FEC function of the terminal is enabled or not, identify the terminal of which the FEC function is enabled as the FEC terminal, and identify the terminal which does not have the FEC function or of which the FEC function is not enabled as the ordinary terminal.

In an example embodiment, the matching component is configured to convert, when the data code stream transmission rate of the transmitting terminal is higher than a data code stream transmission rate of the receiving terminal, the high code stream transmission rate of the transmitting terminal into the low data code stream transmission rate of the receiving terminal, and when the data code stream transmission rate of the transmitting terminal is lower than the data code stream transmission rate of the receiving terminal, convert the low data code stream transmission rate of the transmitting terminal into the high data code stream transmission rate of the receiving terminal.

In an example embodiment, the judgment component is further configured to judge, if a terminal joins the video conference, whether the terminal has an FEC capability or not, if yes, judge whether the FEC function of the terminal is enabled or not, identify the terminal of which the FEC function is enabled as the FEC terminal, and if the terminal does not have the FEC function or the FEC function of the terminal is not enabled, identify the terminal as the ordinary terminal.

In an example embodiment, the device further includes: a notification module, configured to notify identifiers of one or more FEC terminals and one or more ordinary terminals to a system; and a conference management module, configured to display the identifier of each terminal on a video conference interface.

According to the method and device for processing packet loss compensation in the video-conferencing system provided by the embodiments of the disclosure, the code stream processing capabilities of the transmitting terminal and the receiving terminal are matched between the FEC terminals which transmit the code stream or between the FEC terminal and the ordinary terminal which transmit the code stream, and the data code stream transmission rate of the transmitting terminal is converted into the bearable data code stream rate of the receiving terminal. In this way, the terminals with different data stream rates can communicate with each other. In addition, the terminal with packet loss can activate the FEC function to compensate lost data, and the ordinary terminal without packet loss can keep an original data code stream rate for communication to maximally ensure the image quality of the video-conferencing system.

Other characteristics and advantages of the disclosure are to be described below, and partially become apparent in the specification or are known by implementing the disclosure. Aims and other advantages of the disclosure can be fulfilled and achieved by structures specified in the specification, the claims and the drawings.

BRIEF DESCRIPTION OF THE DRAWINGS

The drawings are described here to provide further understanding of the disclosure, and form a part of the disclosure. The schematic embodiments and description of the disclosure are adopted to explain the disclosure, and do not form improper limits to the disclosure. In the drawings.

DETAILED DESCRIPTION OF THE EMBODIMENTS

The example embodiments of the disclosure are described below with reference to the drawings in detail, wherein the drawings form a part of the disclosure, and are adopted to illustrate the principle of the disclosure together with the embodiments of the disclosure.

It is important to note that the embodiments of the disclosure and the characteristics in the embodiments can be combined under the condition of no conflicts.

The FEC terminal in the embodiments of the disclosure is a terminal of which the FEC function is enabled. The ordinary terminal is a terminal of which the FEC function is not enabled or a terminal without any FEC function. In the embodiments of the disclosure, FEC represents forward error correction.

Embodiment 1

Figure 1:
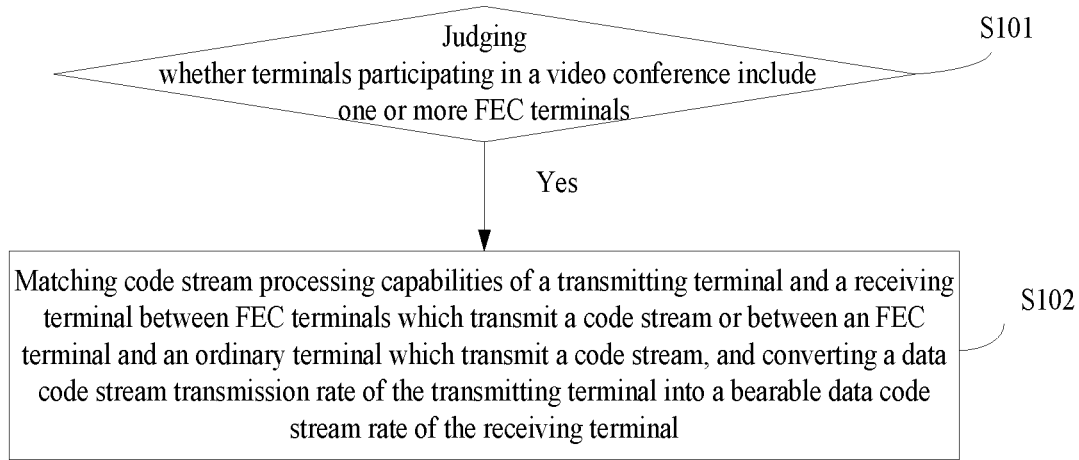
FIG. 1 is a flowchart of a processing method for packet loss compensation in a video-conferencing system according to embodiment 1 of the disclosure.

The embodiment of the disclosure provides a processing method for packet loss compensation in a video-conferencing system, as shown in FIG. 1, the method including:

S101, when a video conference is held, judging whether terminals participating in the video conference include one or more FEC terminals or not, and if yes, entering S102; and S102, matching code stream processing capabilities of a transmitting terminal and a receiving terminal between FEC terminals which transmit a code stream or between an FEC terminal and an ordinary terminal which transmit a code stream, and converting a data code stream transmission rate of the transmitting terminal into a bearable data code stream rate of the receiving terminal.

According to the method for processing packet loss compensation in the video-conferencing system provided by the embodiment of the disclosure, the code stream processing capabilities of the transmitting terminal and the receiving terminal are matched between the FEC terminals which transmit the code stream or between the FEC terminal and the ordinary terminal which transmit the code stream, and the data code stream transmission rate of the transmitting terminal is converted into the bearable data code stream rate of the receiving terminal. In this way, the terminals with different data stream rates can communicate with each other. Specifically, the terminal with packet loss can activate the FEC function to compensate lost data, and the ordinary terminal without packet loss can keep an original data stream rate for communication to maximally ensure the image quality of the video-conferencing system.

Embodiment 2

Figure 2:
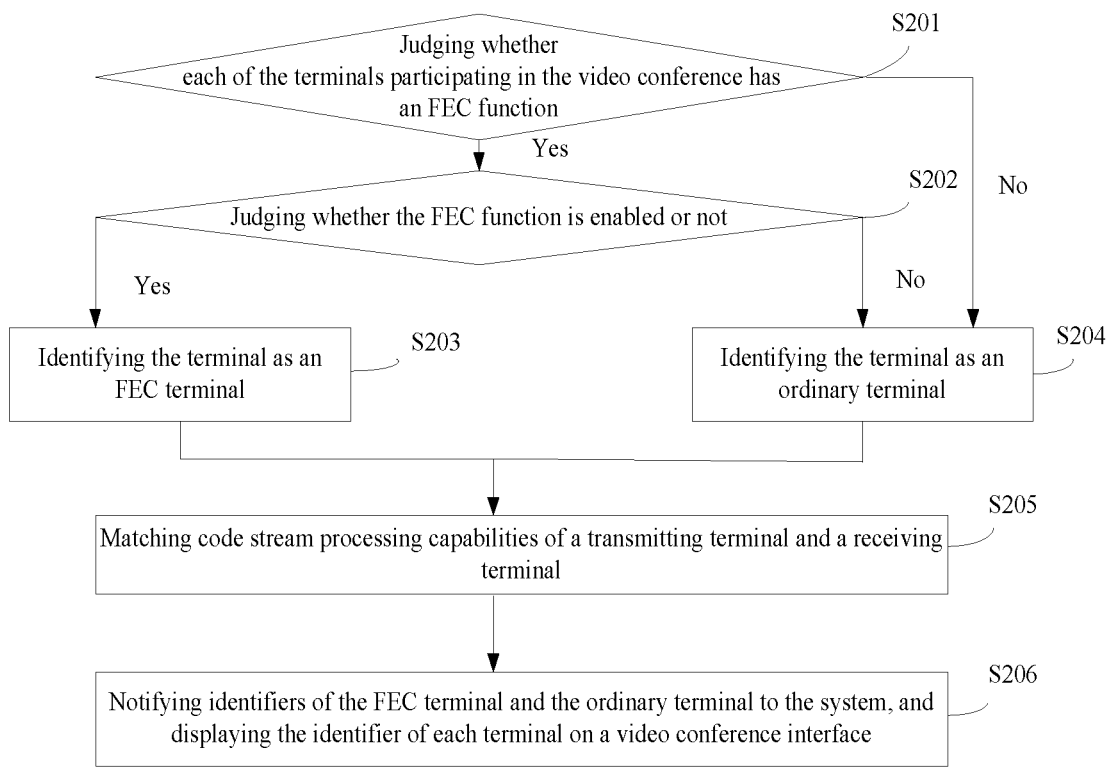
FIG. 2 is a flowchart of a processing method for packet loss compensation in a video-conferencing system according to embodiment 2 of the disclosure.

The embodiment of the disclosure provides a processing method for packet loss compensation in a video-conferencing system, as shown in FIG. 2, the method including:

S201, when a video conference is held, judging whether each terminal participating in the video conference has an FEC function or not, if yes, entering S202, otherwise, entering S204;

S202, judging whether the FEC function of the terminal is enabled or not, if yes, entering S203, and if no, entering S204;

S203, identifying the terminal as an FEC terminal;

S204, identifying the terminal as an ordinary terminal;

S205, matching code stream processing capabilities of a transmitting terminal and a receiving terminal;

when a data code stream transmission rate of the transmitting terminal is higher than a data code stream transmission rate of the receiving terminal, converting the high code stream transmission rate of the transmitting terminal into the low data code stream transmission rate of the receiving terminal;

when the data code stream transmission rate of the transmitting terminal is lower than the data code stream transmission rate of the receiving terminal, converting the low data code stream transmission rate of the transmitting terminal into the high data code stream transmission rate of the receiving terminal;

if a terminal joins the video conference, judging whether the terminal has an FEC capability or not, if yes, judging whether the FEC function of the terminal is enabled or not, and identifying the terminal of which the FEC function is enabled as the FEC terminal; and if the terminal does not have the FEC function or the FEC function of the terminal is not enabled, identifying the terminal as the ordinary terminal; and S206, notifying identifiers of one or more FEC terminals and ordinary terminals to the system, and displaying the identification information of each terminal on a video conference interface.

Embodiment 3

Figure 3:
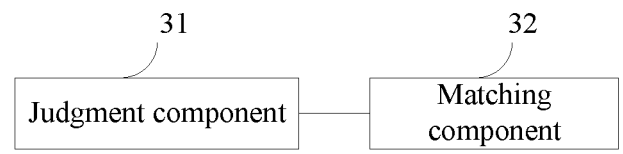
FIG. 3 is a diagram of a processing device for packet loss compensation in a video-conferencing system according to embodiment 3 of the disclosure.

The embodiment of the disclosure provides a processing device for packet loss compensation in a video-conferencing system, as shown in FIG. 3, the device including:

a judgment component 31, configured to judge, when a video conference is held, whether terminals participating in the video conference include one or more FEC terminals or not, and if yes, trigger a matching component; and a matching component 32, configured to match code stream processing capabilities of a transmitting terminal and a receiving terminal between FEC terminals which transmit a code stream or between an FEC terminal and an ordinary terminal which transmit a code stream, and convert a data code stream transmission rate of the transmitting terminal into a bearable data code stream rate of the receiving terminal.

Embodiment 4

Figure 4:
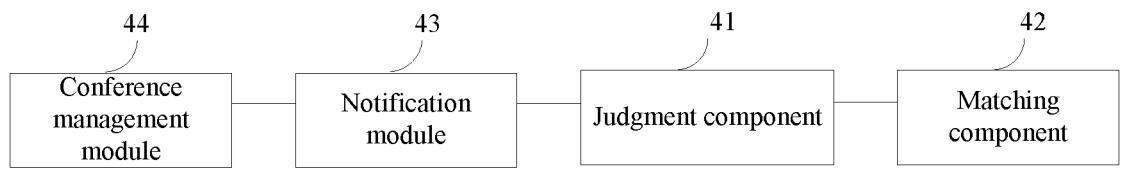
FIG. 4 is a diagram of a processing device for packet loss compensation in a video-conferencing system according to embodiment 4 of the disclosure.

The embodiment of the disclosure provides a processing device for packet loss compensation in a video-conferencing system, as shown in FIG. 4, the device including:

a judgment component 41, configured to judge, when a video conference is held, whether each terminal participating in the video conference has an FEC function or not, if yes, further judge whether the FEC function of the terminal is enabled or not, identify the terminal of which the FEC function is enabled as an FEC terminal, identify the terminal which does not have the FEC function or of which the FEC function is not enabled as an ordinary terminal, if a terminal joins the video conference, judge whether the terminal has an FEC capability or not, if yes, judge whether the FEC function of the terminal is enabled or not, identify the terminal of which the FEC function is enabled as the FEC terminal, and if the terminal does not have the FEC function or the FEC function of the terminal is not enabled, identify the terminal as the ordinary terminal;

a matching component 42, configured to convert, when a code stream transmission rate of a transmitting terminal is higher than a data code stream transmission rate of a receiving terminal, the high code stream transmission rate of the transmitting terminal into the low data code stream transmission rate of the receiving terminal, and when the data code stream transmission rate of the transmitting terminal is lower than the data code stream transmission rate of the receiving terminal, convert the low data code stream transmission rate of the transmitting terminal into the high data code stream transmission rate of the receiving terminal;

a notification module 43, configured to notify identifiers of one or more FEC terminals and one or more ordinary terminals to a conference management module; and a conference management module 44, configured to display the identifier of each terminal on a video conference interface.

Above all, according to the method and device for processing packet loss compensation in the video-conferencing system provided by the embodiments of the disclosure, the code stream processing capabilities of the transmitting terminal and the receiving terminal are matched between the FEC terminals which transmit the code stream or between the FEC terminal and the ordinary terminal which transmit the code stream, and the data code stream transmission rate of the transmitting terminal is converted into the bearable data code stream rate of the receiving terminal. In this way, the terminals with different data stream rates can communicate with each other. Specifically, the terminal with packet loss can activate the FEC function to compensate lost data, and the ordinary terminal without packet loss can keep the original data stream rate for communication to maximally ensure the image quality of the video-conferencing system.

The above is only the example embodiments of the disclosure and not intended to limit the scope of protection of the disclosure, and any modification or replacement which can be easily thought of by those skilled in the technical field within the principle of the disclosure shall fall within the scope of protection of the disclosure. Therefore, the scope of protection of the disclosure should be subject to the scope of protection of claims.

What is claimed is:

1. A processing method for packet loss compensation in a video-conferencing system, comprising:

when a video conference is held, judging whether terminals participating in the video conference comprise one or more Forward Error Correction (FEC) terminals or not, if yes, matching code stream processing capabilities of a transmitting terminal and a receiving terminal between FEC terminals which transmit a code stream or between an FEC terminal and an ordinary terminal which transmit a code stream, and converting a data code stream transmission rate of the transmitting terminal into a bearable data code stream rate of the receiving terminal;

wherein the FEC terminal is a terminal of which the FEC function is enabled; identifiers of one or more FEC terminals and one or more ordinary terminals are notified to a system, and are displayed on a video conference interface.

2. The method according to claim 1, wherein judging whether the terminals participating in the video conference comprise one or more FEC terminals or not comprises:

judging whether each of the terminals participating in the video conference has an FEC function or not, if yes, further judging whether the FEC function of the terminal is enabled or not, and identifying the terminal of which the FEC function is enabled as the FEC terminal; and identifying the terminal which does not have the FEC function or of which the FEC function is not enabled as the ordinary terminal.

3. The method according to claim 2, wherein if a terminal joins the video conference, whether the terminal has an FEC capability or not is judged, if yes, whether the FEC function of the terminal is enabled or not is judged, and the terminal of which the FEC function is enabled is identified as the FEC terminal; and if the terminal does not have the FEC function or the FEC function of the terminal is not enabled, the terminal is identified as the ordinary terminal.

4. The method according to claim 1, wherein matching the code stream processing capabilities of the transmitting terminal and the receiving terminal and converting the code stream transmission rate of the transmitting terminal into the bearable code stream rate of the receiving terminal comprise:
when the data code stream transmission rate of the transmitting terminal is higher than a data code stream transmission rate of the receiving terminal, converting the high code stream transmission rate of the transmitting terminal into the low data code stream transmission rate of the receiving terminal; and
when the data code stream transmission rate of the transmitting terminal is lower than the data code stream transmission rate of the receiving terminal, converting the low data code stream transmission rate of the transmitting terminal into the high data code stream transmission rate of the receiving terminal.

5. The method according to claim 4, wherein if a terminal joins the video conference, whether the terminal has an FEC capability or not is judged, if yes, whether the FEC function of the terminal is enabled or not is judged, and the terminal of which the FEC function is enabled is identified as the FEC terminal; and if the terminal does not have the FEC function or the FEC function of the terminal is not enabled, the terminal is identified as the ordinary terminal.

6. The method according to claim 1, wherein if a terminal joins the video conference, whether the terminal has an FEC capability or not is judged, if yes, whether the FEC function of the terminal is enabled or not is judged, and the terminal of which the FEC function is enabled is identified as the FEC terminal; and if the terminal does not have the FEC function or the FEC function of the terminal is not enabled, the terminal is identified as the ordinary terminal.

7. A processing device for packet loss compensation in a video-conferencing system, comprising:
a judgment component, configured to judge, when a video conference is held, whether terminals participating in the video conference comprise one or more Forward Error Correction (FEC) terminals or not, and if yes, trigger a matching component; and
a matching component, configured to match code stream processing capabilities of a transmitting terminal and a receiving terminal between FEC terminals which transmit a code stream or between an FEC terminal and an ordinary terminal which transmit a code stream, and convert a data code stream transmission rate of the transmitting terminal into a bearable data code stream rate of the receiving terminal;
wherein the FEC terminal is a terminal of which the FEC function is enabled;
wherein the device further comprises: a notification module, configured to notify identifiers of one or more FEC terminals and one or more ordinary terminals to a conference management module; and the conference management module, configured to display the identifier of each terminal on a video conference interface.

8. The device according to claim 7, wherein
the judgment component is configured to judge whether each of the terminals participating in the video conference has an FEC function or not, if yes, further judge whether the FEC function of the terminal is enabled or not, identify the terminal of which the FEC function is enabled as the FEC terminal, and identify the terminal which does not have the FEC function or of which the FEC function is not enabled as the ordinary terminal.

9. The device according to claim 8, wherein
the judgment component is further configured to judge, if a terminal joins the video conference, whether the terminal has an FEC capability or not, if yes, judge whether the FEC function of the terminal is enabled or not, identify the terminal of which the FEC function is enabled as the FEC terminal, and if the terminal does not have the FEC function or the FEC function of the terminal is not enabled, identify the terminal as the ordinary terminal.

10. The device according to claim 7, wherein
the matching component is configured to convert, when the data code stream transmission rate of the transmitting terminal is higher than a data code stream transmission rate of the receiving terminal, the high code stream transmission rate of the transmitting terminal into the low data code stream transmission rate of the receiving terminal, and when the data code stream transmission rate of the transmitting terminal is lower than the data code stream transmission rate of the receiving terminal, convert the low data code stream transmission rate of the transmitting terminal into the high data code stream transmission rate of the receiving terminal.

11. The device according to claim 10, wherein
the judgment component is further configured to judge, if a terminal joins the video conference, whether the terminal has an FEC capability or not, if yes, judge whether the FEC function of the terminal is enabled or not, identify the terminal of which the FEC function is enabled as the FEC terminal, and if the terminal does not have the FEC function or the FEC function of the terminal is not enabled, identify the terminal as the ordinary terminal.

12. The device according to claim 7, wherein
the judgment component is further configured to judge, if a terminal joins the video conference, whether the terminal has an FEC capability or not, if yes, judge whether the FEC function of the terminal is enabled or not, identify the terminal of which the FEC function is enabled as the FEC terminal, and if the terminal does not have the FEC function or the FEC function of the terminal is not enabled, identify the terminal as the ordinary terminal.

* * * * *